July 19, 1966 H. J. SENTIFF 3,261,237
FILM MAGAZINE LEADER RETRIEVING METHOD
Filed Sept. 15, 1964
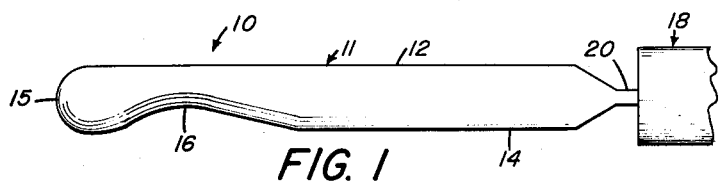
FIG. 1
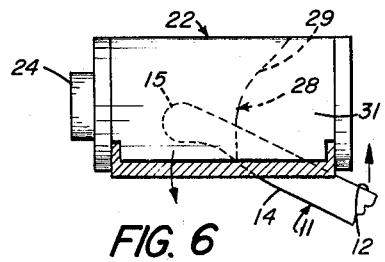
FIG. 6
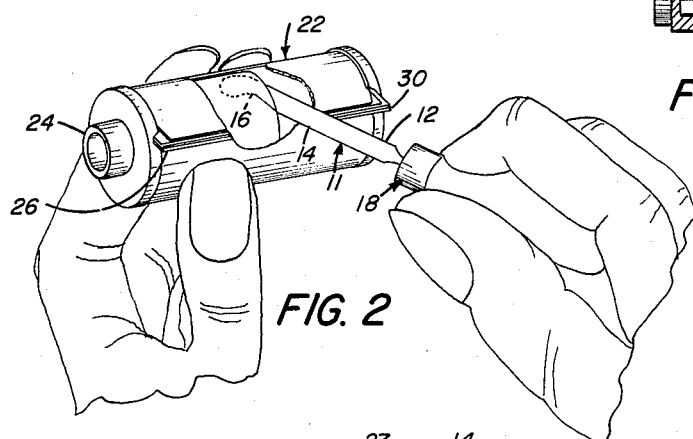
FIG. 2
FIG. 3
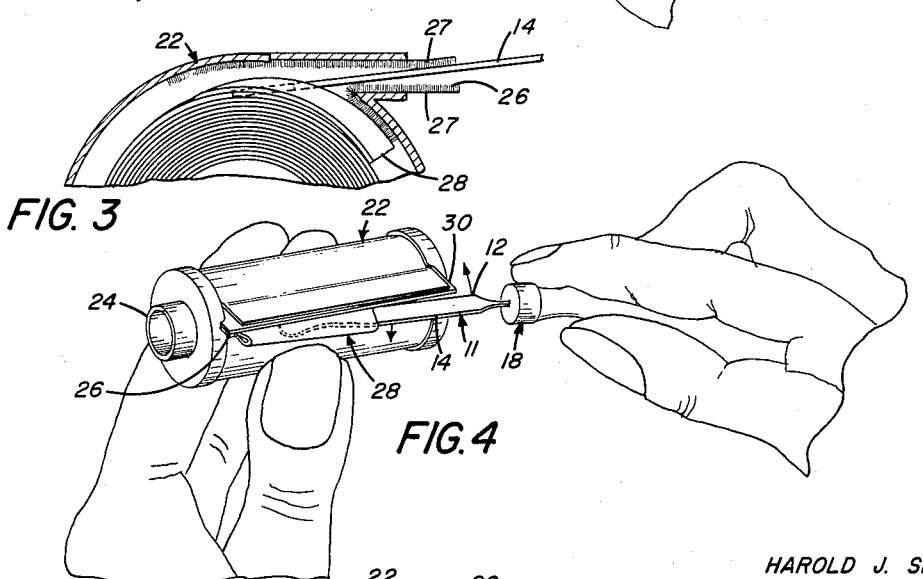
FIG. 4
FIG. 5
HAROLD J. SENTIFF
INVENTOR.
BY R. Frank Smith
Malcolm G. Dunn
ATTORNEYS

United States Patent Office 3,261,237
Patented July 19, 1966

3,261,237
FILM MAGAZINE LEADER RETRIEVING METHOD
Harold J. Sentiff, Rochester, N.Y., assignor to Eastman Kodak Company, Rochester, N.Y., a corporation of New Jersey
Filed Sept. 15, 1964, Ser. No. 396,493
4 Claims. (Cl. 81—3)

The present invention relates to film loaded magazines for cameras and particularly is directed to a method and a device for retrieving a film leader which has been inadvertently wound inside a film magazine of the type similar to that illustrated in U.S. Patent No. 2,176,507, issued to August Nagel.

The conventional film magazine is light-tight and substantially cylindrical in configuration and is provided with closed ends. A longitudinally extending slot forming a film passageway is provided along one side of the magazine; the inside of the passageway may be lined with dark plush which prevents entry of light but enables the film to pass into and out of the magazine through the slot. A length of film leader extends from the slot of a film loaded magazine to permit the operator to connect the film from the magazine to the camera take-up spool so that successive film frames may be advanced into position over the exposure aperture. Occasionally the film threading leaders are inadvertently rewound into the film magazine prior to camera exposure or after exposure when processing in daylight loading tank equipment is desired. When this happens, it is necessary to go into a dark room and dismantle the magazine so as to rethread the leader through the slot for extension outside of the magazine. If the magazine is the type having ends impossible to remove without seriously damaging the magazine beyond further use, then the entire film may be wasted unless a spare empty magazine is available.

Accordingly, one of the objects of the present invention is to provide a device for retrieving the leader from within the film magazine without the necessity of going into a dark room and dismantling the film magazine.

A further object is to provide a method for retrieving a film leader which has been inadvertently rewound into a film magazine before there has been an opportunity to use the film within the magazine.

Other objects inherent in the character of the novel method and device will be evident from the disclosure which follows:

In the drawings that form a part of the disclosure of this invention:

FIG. 1 illustrates a plan view of the retrieval device and a fragmentary portion of the handle;

FIG. 2 shows the film magazine partly broken away and illustrates the position of the retrieval device with respect to the roll of film in the magazine when the retrieval device is inserted into the magazine through the film passageway;

FIG. 3 is an enlarged end sectional view of FIG. 2 illustrating the blade of the retrieval device inserted between the outer convolution of the film leader and the adjacent convolution of the roll of film;

FIG. 4 illustrates the retrieval device removing a folded portion of film leader from the magazine;

FIG. 5 is an enlarged end sectional view of the film magazine shown in FIG. 4 and illustrates the retrieval device pulling a folded portion of the film leader through the film passageway of the magazine; and FIG. 6 is a plan view of the film magazine illustrating the taper of the film leader in dotted lines.

The retrieval device 10 comprises a thin, narrow blade, indicated generally at 11, having dull edges and preferably made of stainless steel which is rust-free and thus will avoid possible contamination of the film and the inside of the film magazine when the blade is used to retrieve a film leader. One edge 12 of the blade is straight and the other edge 14 is substantially straight with the exception of a relieved portion which extends inwardly of the straight edge adjacent the rounded free end 15 of the blade and forms a tapered notch 16. The blade is suitably secured to a handle 18 by the tang 20 of the blade for ease of handling by the operator.

The operation of retrieving a film leader which has been inadvertently rewound into a magazine will be described with reference to FIGS. 2, 3, 4, 5, and 6. The conventional film magazine 22 is held in the operator's left hand with the film spool hub extension 24 of the magazine to the left of the operator.

The film leader 28 is tapered inwardly along one edge, as shown at 29 in FIG. 6, in a conventional manner, the tapered edge facing toward the right of the magazine when held in the operator's left hand as described above. The operator holds the retrieval device 10 in his right hand and inserts the blade 11 through the thin slot 26 and between the dark plush 27 of the magazine with the edge 12 of the blade facing to the right as may be observed in FIG. 2. The operator may "feel" for the tapered edge of the film leader 28 by sliding the blade toward the left. If the blade continues to move all the way to the left, then the tapered edge of the film leader is not in proper position to be sensed, therefore, the operator should rotate the roll of film within the magazine a couple of turns by means of the hub extension 24 until the tapered edge 29 is in position illustrated in FIGS. 3 and 6. The blade then readily slides beneath and between the outer convolution of the film leader and the adjacent convolution 31 (FIG. 6) of the film, as illustrated in FIG. 3.

The one edge 12 of the blade is moved against the right hand edge 30 of the slot 26, which serves as a fulcrum point on which the blade pivots for levering out a folded portion of the film leader through the slot or film passageway as shown by the arrows in FIG. 4. As illustrated in FIGS. 3 and 5, as the blade is pivoted, it brings out a folded portion through the slot. The rounded free end 15 of the blade adjacent the relieved portion or tapered notch 16 engages approximately the center of the width of the film leader, as illustrated in FIG. 4. The purpose of the tapered notch 16 is to prevent the straight part of the blade edge from initially contacting the edge of the film leader with the probable result of severing the leader inwardly from its edge as the blade is pivoted. Obviously, the severing of the film leader would defeat its removal from within the magazine. The leader is then pulled out partially folded as shown in FIGS. 4 and 5. The folded portion occurs because at the point where the blade is insertable between the outer and inner convolutions of the film, the free end of the film leader 28 extends around the roll beyond the film passageway (note FIG. 3). Once the film leader folded portion has been levered outwardly through the slot in the magazine, the leader may then be grasped by the operator for subsequent loading of the magazine into operative connection with the camera.

It will now be apparent that the device disclosed is simply constructed, and is thus inexpensive to produce. It will also be apparent that the device is easy to operate for the purpose described.

The invention has been described in detail with particular reference to the preferred embodiment thereof, but it will be understood that variations and modifications can be effected within the spirit and scope of the invention as described hereinabove and as defined in the appended claims.

I claim:

1. The method of removing a film leader from within a film magazine, wherein the magazine has a longitudinally extending slot along one side parallel with the axis of the roll of film within the magazine and defining a film passageway, the width of the film passageway being greater than the width of the film leader, the steps of:
   - inserting the free end portion of the length of a flat, narrow, dull-edged blade through said film passageway;
   - engaging one edge of said blade against the adjacent end of said slot;
   - swinging said blade free end portion inwardly toward the center of the length of the magazine pivoting said one blade edge against said adjacent end of the slot until said free end portion of the blade slips beneath and between a portion of said film leader and the adjacent convolution of film; and
   - continuing the pivoting of the blade back through and out of said film passageway pulling outwardly on the blade and bringing with the blade a portion of said film leader folded about said blade.

2. The method of removing a film leader which has been wound inside a film magazine having a cylindrical body portion, closed ends, and a thin longitudinally extending slot defining a film passageway for the roll of film contained within the magazine, the width of the film leader being less than that of the film passageway, the steps of:
   - inserting a thin bladed tool through said film passageway;
   - pivoting one edge of said tool against one end of said slot;
   - moving the remote end of the tool beneath the outer convolution of film constituting a portion of film leader and into engagement with the center of the width of said leader; and
   - swinging said remote end of the tool in a direction outwardly through said film passageway bringing with said remote end a portion of said film leader folded about said tool.

3. The method of removing a film leader from a film magazine, wherein the magazine has a longitudinally extending slot along one side parallel with the axis of the roll of film contained within the magazine and defining a film passageway, the width of the passageway being greater than the width of the film leader, the steps of:
   - inserting the free end portion of the length of a thin tool capable of passing through said film passageway into said film passageway;
   - using one end of said slot for a pivoting support for said thin tool and swinging said free end portion inwardly toward the center of the axial length of the magazine until the tool slips beneath and between a portion of said film leader and adjacent convolution of film and thus engages the area of the film leader inwardly from the film leader edge adjacent the tool; and
   - continuing the pivoting of the tool out through and back of said film passageway pulling outwardly with the tool a portion of said film leader about said tool.

4. The method of removing a film leader which has been rewound into a film magazine, wherein the magazine has a longitudinally extending slot along one side parallel with the axis of a roll of film contained within the magazine and defining a film passageway, the width of the passageway being greater than the width of the film leader, the steps of:
   - inserting the free end portion of the length of a thin tool capable of passing through said film passageway into said film passageway; and
   - swinging said tool against the adjacent end of said slot until said free end portion engages and pushes out through said film passageway a portion of the film leader partially folded about said tool.

References Cited by the Examiner
UNITED STATES PATENTS

| D. 189,533 | 1/1961 | Bohlmann | 30—317 |
| 2,759,263 | 8/1956 | Shigley et al. | 30—317 |
| 3,076,263 | 2/1963 | Musto | 30—317 |

WILLIAM FELDMAN, *Primary Examiner.*

OTHELL M. SIMPSON, *Examiner.*